(12) United States Patent
Johnsen et al.

(10) Patent No.: US 7,443,860 B2
(45) Date of Patent: Oct. 28, 2008

(54) METHOD AND APPARATUS FOR SOURCE AUTHENTICATION IN A COMMUNICATIONS NETWORK

(75) Inventors: Bjorn Dag Johnsen, Oslo (NO); Christopher Jackson, Westford, MA (US); David Brean, Boston, MA (US); Ola Tørudbakken, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 883 days.

(21) Appl. No.: 10/863,854

(22) Filed: Jun. 8, 2004

(65) Prior Publication Data
US 2005/0286511 A1    Dec. 29, 2005

(51) Int. Cl.
*H04L 12/56* (2006.01)

(52) U.S. Cl. ............... 370/395.3; 370/389; 370/392; 370/474

(58) Field of Classification Search ........... 370/389, 370/392, 395.3, 400, 419, 474, 370
See application file for complete search history.

(56) References Cited

U.S. PATENT DOCUMENTS

| 7,061,899 | B2 * | 6/2006 | Walker et al. ............. 370/351 |
| 7,225,467 | B2 * | 5/2007 | Dapp ....................... 726/23 |
| 7,245,627 | B2 * | 7/2007 | Goldenberg et al. ........ 370/419 |
| 2001/0037435 | A1 * | 11/2001 | Van Doren ................ 711/153 |
| 2004/0022245 | A1 * | 2/2004 | Forbes et al. ............. 370/392 |
| 2005/0111465 | A1 * | 5/2005 | Stewart .................... 370/400 |

* cited by examiner

*Primary Examiner*—Huy D. Vu
*Assistant Examiner*—Asif H Khan
(74) *Attorney, Agent, or Firm*—Park, Vaughan & Fleming, LLP

(57) ABSTRACT

One embodiment of the invention provides a method of handling an incoming packet at a node in a network. The method includes associating at least one source identifier with a link into the node. A packet is then received at the node over the link, and a source identifier is extracted from the received packet. The extracted source identifier is compared with the source identifier(s) associated with the link in order to authenticate the packet.

32 Claims, 9 Drawing Sheets

METHOD AND APPARATUS FOR SOURCE AUTHENTICATION IN A COMMUNICATIONS NETWORK

RELATED APPLICATIONS

The present application is related to the following applications, all of which are filed on the same day and assigned to the same assignee as the present application:

"SWITCH METHOD AND APPARATUS WITH CUT-THROUGH ROUTING FOR USE IN A COMMUNICATIONS NETWORK" (application Ser. No. 10/863,016), Inventors: Bjorn Dag Johnsen, Hans Rygh and Morten Schanke;

"METHOD AND APPARATUS FOR VERIFYING SERVICE LEVEL IN A COMMUNICATIONS NETWORK" (application Ser. No. 10/862,019), Inventors: Bjorn Dag Johnsen, Christopher Jackson, David Brean and Ola Torudbakken;

"SWITCHING METHOD AND APPARATUS FOR USE IN A COMMUNICATIONS NETWORK" (application Ser. No. 10/862,970), Inventors: Bjorn Dag Johnsen, Christopher Jackson, David Brean, Ola Torudbakken, Steinar Forsmo, Hans Rygh, Morten Schanke;

"CREDIT ANNOUNCEMENT" (application Ser. No. 10/863,373), Inventors: Morten Schanke, Hans Rygh, Marius Hansen and Mathias Hoddevik;

"ADAPTIVE CUT-THROUGH ALGORITHM" (application Ser. No. 10/862,987), Inventors: Morten Schanke, Brian Manula and Magne Sandven;

"COMMA DETECTION" (application Ser. No. 10/863,374), Inventors: Magne Sandven, Morten Schanke and Brian Manula;

"SERVICE LEVEL TO VIRTUAL LANE MAPPING" (application Ser. No. 10/862,985), Inventors: Steinar Forsmo, Hans Rygh and Ola Torudbakken;

"INPUT AND OUTPUT BUFFERING" (application Ser. No. 10/863,038), Inventors: Hans Rygh, Morten Schanke, Ola Torudbakken and Steinar Forsmo;

"CODEC IMPLEMENTATION FOR INFINIBAND" (application Ser. No. 10/863,439), Inventors: Steinar Forsmo, Mathias Hoddevik and Magne Sandven;

"VCRC CHECKING AND GENERATION" (application Ser. No. 10/863,013), Inventors: Steinar Forsmo, Hans Rygh, Morten Schanke and Ola Torudbakken;

"COMMUNITY SEPARATION ENFORCEMENT" (application Ser. No. 10/863,544), Inventors: Ola Torudbakken and Bjorn Dag Johnsen;

"STUMPING MECHANISM" (application Ser. No. 10/863,373), Inventors: Brian Manula, Ali Bozkaya and Magne Sandven.

The above-identified applications are all hereby incorporated by reference into the present application.

FIELD OF THE INVENTION

The present invention relates to communications networks, and in particular to the authentication of packets travelling over such networks.

BACKGROUND OF THE INVENTION

The security of data communications networks is become increasingly important. As more and more sensitive data is transmitted over such networks, it is very important that data belonging to one user on the network does not somehow become exposed or visible to another user on the network. In addition, as organisations place ever greater reliance on the availability of networks for conducting their business and other operations, a network must be robust against hardware and software errors, component down-time, abnormal traffic conditions, and so on.

Some network problems may be innocent (i.e. non-malicious) in origin. For example, they may be caused by a hardware failure, a software bug, or some other weakness. In other cases, an adversary may try to cause network problems deliberately with malicious intent, such as for motives of terrorism, commercial gain, political persuasion, etc.. Depending upon the motives of the attack, the particular objective may be to obtain inappropriate access to data communications over the network, or to induce non-availability or some other non-functioning of the network. A malicious attack may exploit a known weakness in the network, and/or the attack may attempt to generate problems by the deliberate injection of errors, anomalous traffic, and so on.

It is therefore important for a network to be reliable and secure, and to be as resistant as possible against problems, whether deliberate or otherwise.

SUMMARY OF THE INVENTION

Accordingly, one embodiment of the invention provides a method of handling an incoming packet at a node in a network. The method includes associating at least one source identifier with a link to the node, and receiving a packet at the node over the link. A source identifier is extracted from the received packet and compared with the source identifier associated with the link, thereby allowing the packet to be authenticated. This approach provides assurance to the receiving node that the packet was actually send by the source (node) that it appears to have been sent by. This can be a valuable check, for example, if it is desired to provide different nodes with access to different data or different services.

In one embodiment, the source identifier associated with a link comprises at least one range of source identifiers, and the extracted source identifier is authenticated if it lies within the range(s) of source identifiers. A pair of registers may be used to store each range of source identifiers for performing the comparison.

In one embodiment, the node comprises a switch in the network having multiple ports, and the link is connected to one of the ports of the switch. An incoming packet to the switch includes a destination identifier having the same format as the source identifier. The switch includes a routing table that maps a destination identifier to one of the multiple ports for onward transmission of the packet. The switch may include a routing table for each port, which is then used to perform the authentication. In one embodiment, this is achieved by accessing the routing table using the extracted source identifier as if it were a destination identifier in order to determine whether or not a received source identifier is legal for that port.

In one embodiment the incoming packet is discarded if the packet is not authenticated, and an error notification may be raised.

In one embodiment, the authentication is only performed if the link is connected to an untrusted node in the network. Such an untrusted node may for example, represent an end node rather than a switch, or a switch that is not included in a group of trusted switches.

Another embodiment of the invention provides a communications node comprising a port for connection to a link to receive an incoming packet from a network and memory associating at least one source identifier with the link. The node further includes logic for comparing a source identifier extracted from the received packet with the source identifier associated with said link in order to authenticate the packet. The communications node may be implemented by a switch.

It will be appreciated that the communications node embodiment of the invention will generally benefit from the same particular features as the method embodiment of the invention described above.

BRIEF DESCRIPTION OF THE DRAWINGS

Specific embodiments of the present invention will now be described by way of example only with reference to the accompanying figures in which.

DETAILED DESCRIPTION

1) The InfiniBand Architecture

The InfiniBand architecture provides a standard computer networking environment defined and administered by the InfiniBand Trade Association, which was founded by Compaq, Dell, Hewlett-Packard, IBM, Intel, Microsoft and Sun Microsystems (InfiniBand is a trademark of the InfiniBand Trade Association; other names are trademarks of their respective companies). The InfiniBand Architecture defines a System Area Network (SAN) for connecting multiple independent processor platforms (i.e. host processor nodes), I/O platforms and I/O devices. A full definition of the InfiniBand Architecture may be found in the InfiniBand Architecture Specification Volumes 1 and 2, available from the InfiniBand Trade Association (www.InfiniBandta.org), and which is hereby incorporated hereinto by reference.

An InfiniBand Architecture system area network (SAN) provides a communications and management infrastructure supporting both I/O and interprocessor communications for one or more computer systems. An InfiniBand Architecture system can range from a small server with one processor and a few I/O devices to a massively parallel supercomputer installation with hundreds of processors and thousands of I/O devices.

The InfiniBand Architecture defines a switched communications fabric allowing many devices to communicate concurrently with high bandwidth and low latency in a protected, remotely managed environment. An end node can communicate over multiple InfiniBand Architecture ports and can utilise multiple paths through the InfiniBand Architecture fabric. A multiplicity of InfiniBand Architecture ports and paths through the network are provided both for fault tolerance and for increased data transfer bandwidth.

Figure 1:
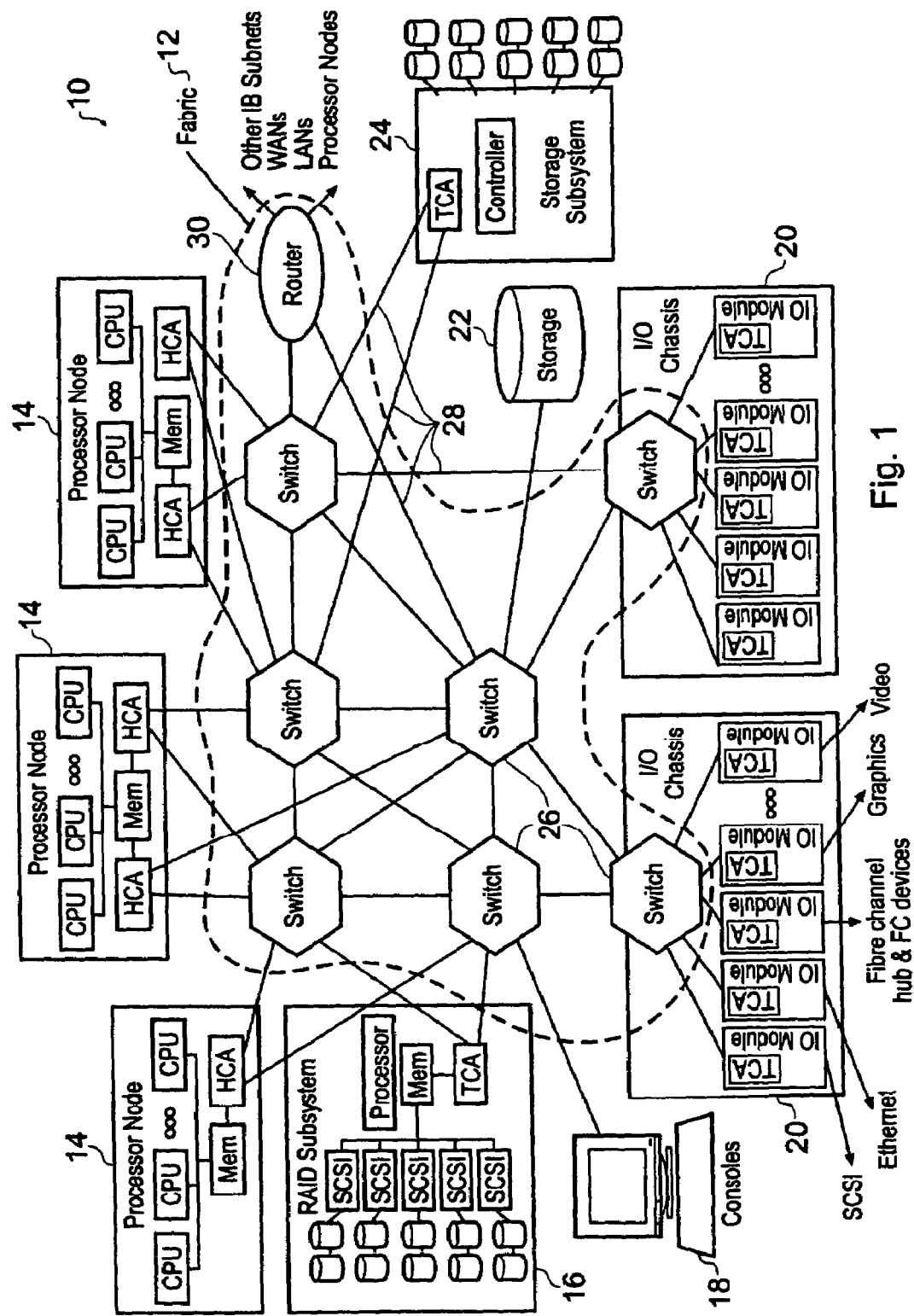
FIG. 1 is a schematic block diagram showing an example of interconnection of computing system elements via the InfiniBand networking architecture.

An example of an InfiniBand Architecture system area network is shown in FIG. 1. As can be seen from FIG. 1, the system area network 10 comprises an InfiniBand Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with InfiniBand links 28 providing data connections between the switches 26 and between the nodes attached to the fabric 12. Also included in the fabric 12 is a router 30 for providing connections to and from other networks, which may be other InfiniBand Architecture subnets, non-InfiniBand Architecture LANs and WANs, and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each endnode 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32. For example, a processor node 14 may comprise a plurality of processors and each processor may have one or more individual Queue Pairs assigned to handle requests and responses flowing to and from that particular processor of the processor node via fabric 12. Alternatively, or in addition, a processor of a given processor node 14 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
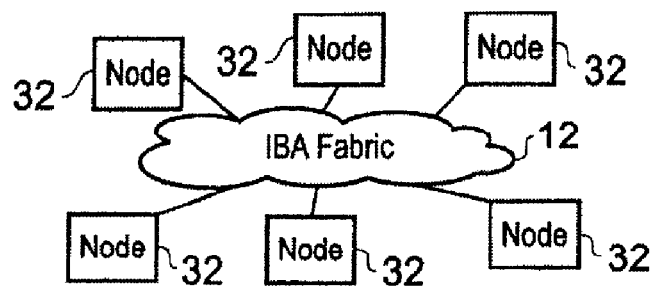
FIG. 2 is a schematic block diagram of a simplified arrangement of an InfiniBand Architecture system.
Figure 3:
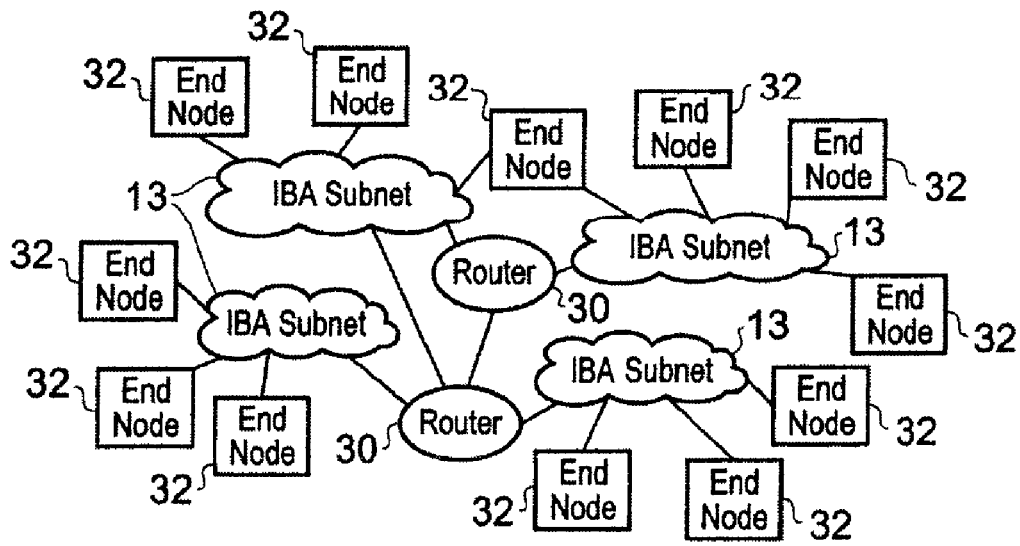
FIG. 3 is a schematic block diagram of another simplified arrangement of an InfiniBand Architecture system.
Figure 4:
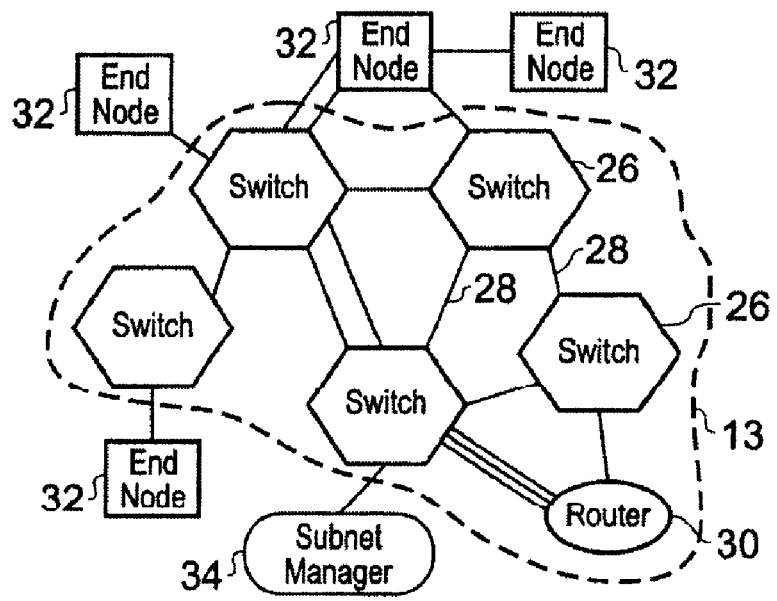
FIG. 4 is a schematic block diagram of a further simplified arrangement of an InfiniBand Architecture system.

Examples of possible InfiniBand Architecture topologies are shown in FIGS. 2, 3 and 4. FIG. 2 shows a high level simplified topology example where a number of end nodes 32 are interconnected by the fabric 12. An InfiniBand Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
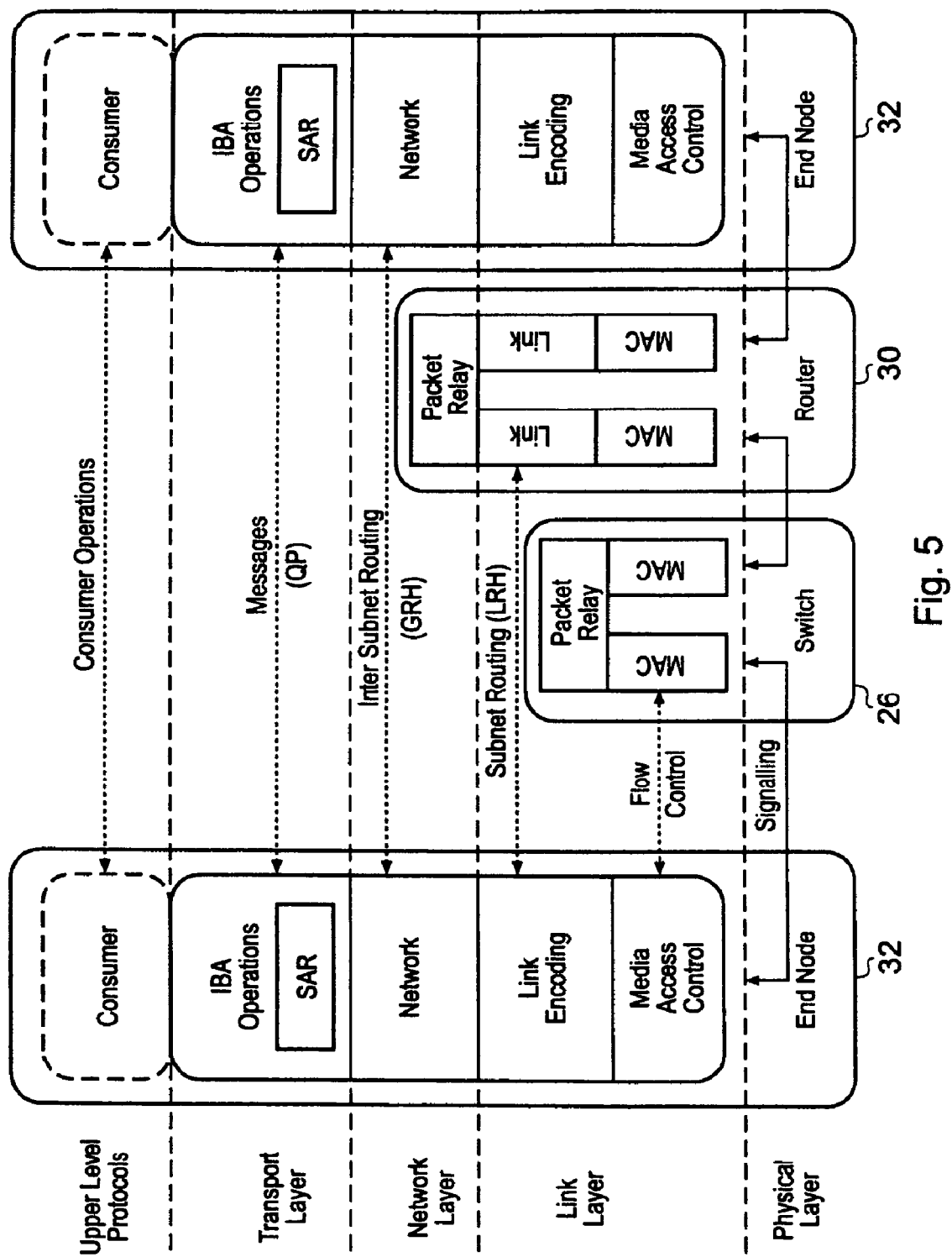
FIG. 5 is a schematic illustration of the layers of an InfiniBand Architecture system.

Referring now to FIG. 5, there is shown an illustration of the architecture layers of an InfiniBand Architecture system. Starting with the physical layer, this specifies how bits are placed onto the interconnections 28 and defines the symbols used for framing (i.e. start of packet and end of packet), data, and fill between packets (idles). It also specifies the signalling protocol as to what constitutes a validly formed packet (i.e. symbol encoding, proper alignment of framing symbols, no invalid or non-data symbols between start and end delimiters, no disparity errors, synchronisation method, etc.). The signalling protocol used by the InfiniBand Architecture utilises a differential signal. The interconnects 28 between nodes of an InfiniBand Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

Figure 6:
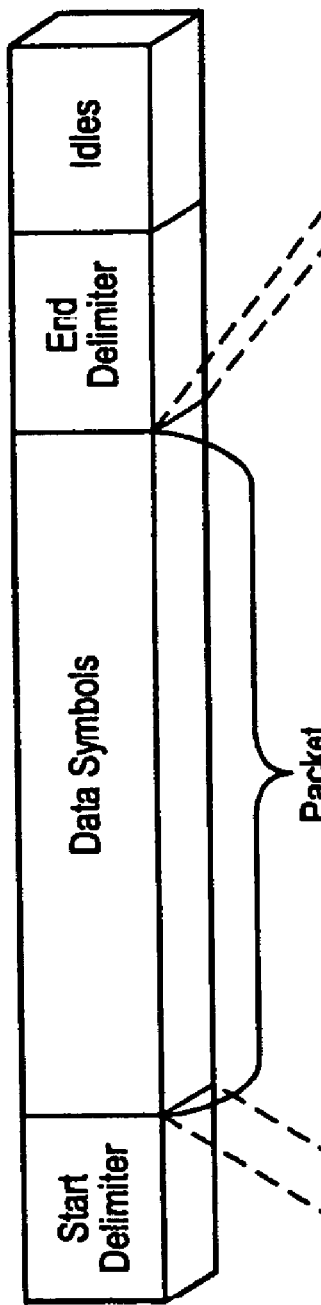
FIG. 6 shows schematically the structure of a message to be transmitted via an InfiniBand Architecture system.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
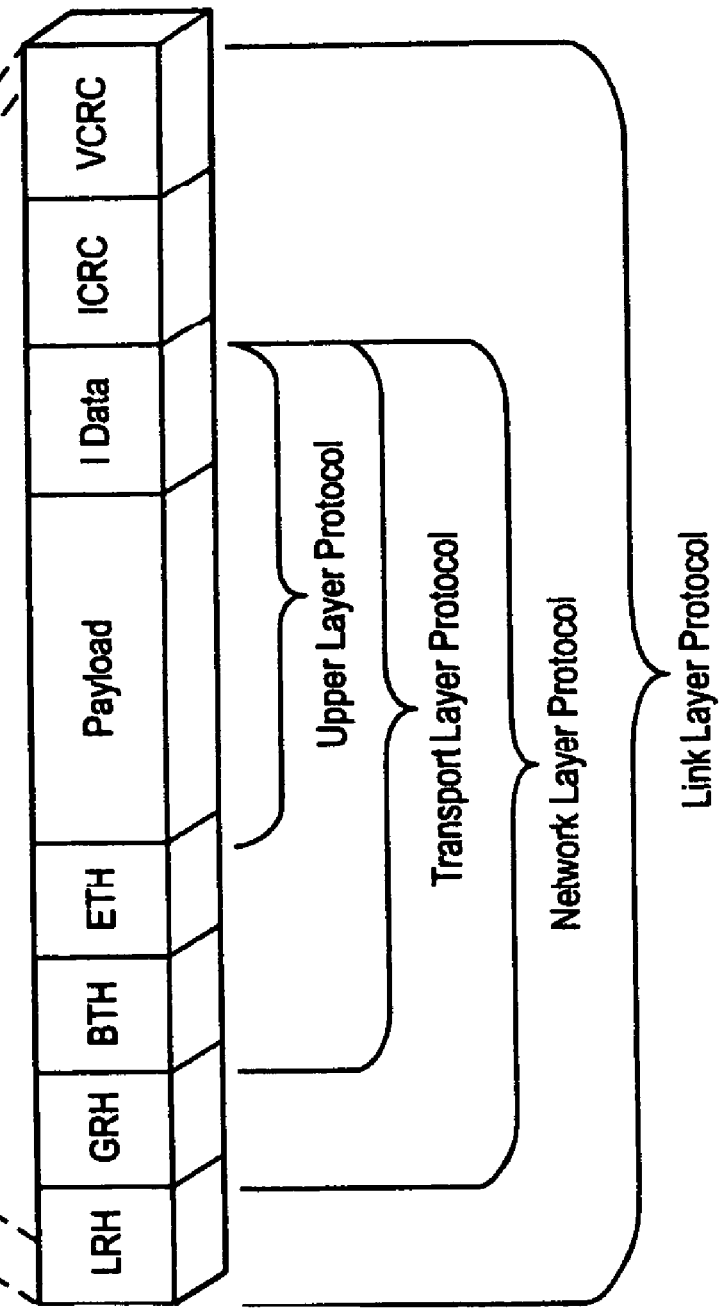
FIG. 7 shows schematically the format of a packet of the message of FIG. 6.

The data packet format is illustrated in FIG. 7. Packets may be one of two types, IBA (InfiniBand Architecture) Packets or RAW (non InfiniBand Architecture) Packets. IBA Packets have IBA defined transport headers, are routed on InfiniBand Architecture fabrics 12, and use native InfiniBand Architecture transport facilities. Raw Packets may be routed on IBA fabrics but do not contain InfiniBand Architecture transport headers. From an InfiniBand point of view, these packets contain only InfiniBand routing headers, payload and CRC. The InfiniBand Architecture does not define the processing of these packets above the link and network layers. These packets can be used to support non-InfiniBand Architecture transports (e.g. TCP/IP, IPX/SPX, NetBUI etc) over an InfiniBand fabric.

The link layer describes the packet format and protocols for packet operation, e.g. flow control and how packets are routed within a subnet between the source and the destination. Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets. Each end of the link has a transmitter and a receiver. The InfiniBand Architecture utilises an "absolute" credit based flow control scheme, in which InfiniBand Architecture receivers provide a "credit limit". A credit limit is an indication of the total amount of data that a transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The InfiniBand Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement back to the originator end node to indicate whether all packets have been received successfully.

The upper level protocols are completely software based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
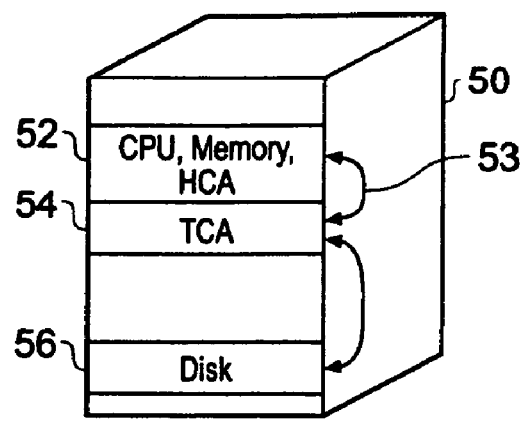
FIG. 8 is a schematic block diagram showing an arrangement where the InfiniBand Architecture is used to interconnect components within a computer system.
Figure 9:
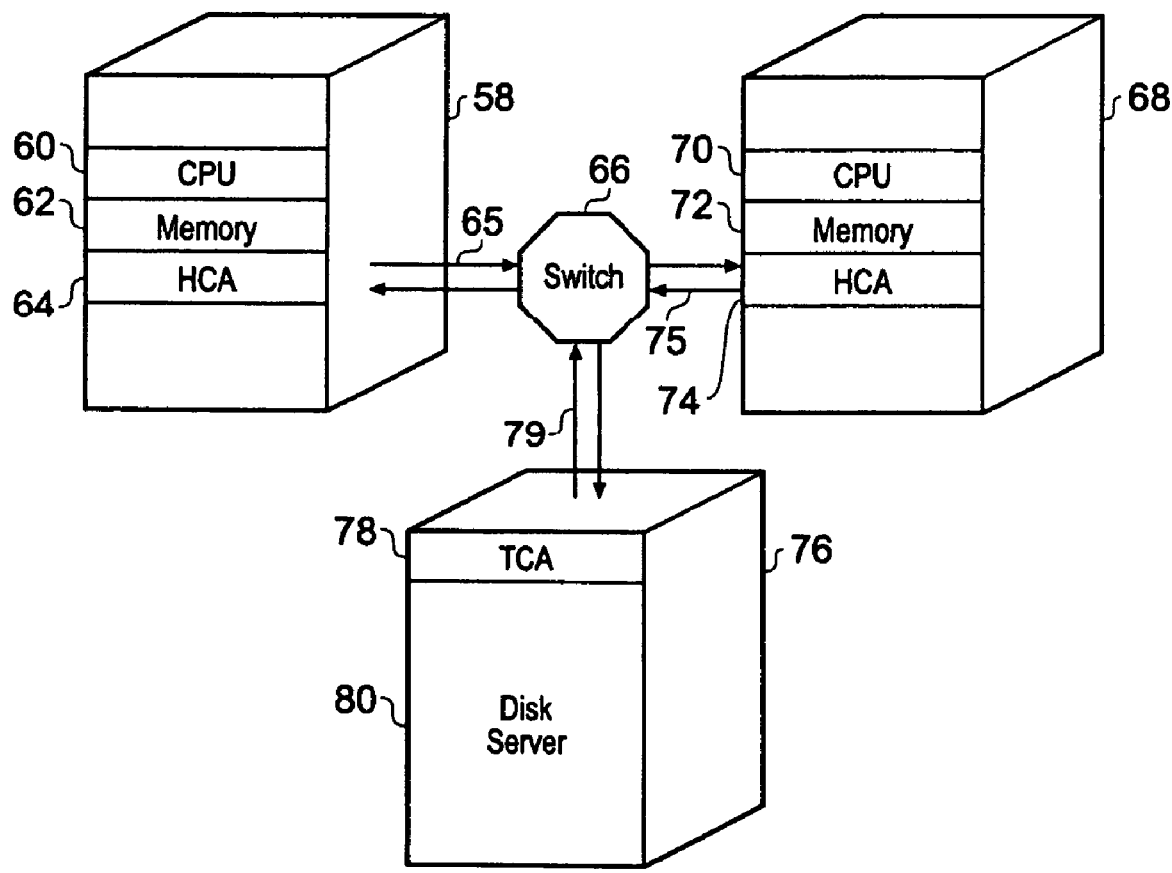
FIG. 9 is a schematic block diagram showing an arrangement where the InfiniBand Architecture is used as an interconnect between computer systems.

Examples of simple InfiniBand Architecture systems are shown in FIGS. 8 and 9. FIG. 8 shows an arrangement where the InfiniBand Architecture is used to interconnect components within a standard computer system rack 50. In this example, the CPU, memory and a Host Channel Adapter 52 are interconnected using conventional non-InfiniBand Architecture techniques. The Host Channel Adapter 52 of the CPU and memory communicate via an InfiniBand Architecture interconnect 53 with a Target Channel Adapter 54. The Target Channel Adapter 54 communicates with a disk drive unit 56 via a SCSI (Small Computer System Interface) connection. Thus the InfiniBand Architecture is configured in this example to facilitate communications between elements of the same computer system.

FIG. 9 shows an arrangement where the InfiniBand Architecture is used only as an interconnect between computers. In this example a first computer system is mounted in a rack 58 and comprises a CPU 60, memory 62 and a Host Channel Adapter 64 interconnected via non-InfiniBand Architecture techniques. Via the Host Channel adapter 64, the first computer system communicates to and from a switch 66 across interconnects 65. Also connected to the switch 66 is a second computer system mounted in a rack 68 and comprising a CPU 70, memory 72 and a Host Channel Adapter 74, which connects to the switch 66 via interconnects 75. Data storage for the first and second computer systems is provided by a disk server 80 mounted in a rack 76. The disk server 80 connects with a Target Channel Adapter 78 also mounted within the rack 76 by non-InfiniBand Architecture techniques. The Target Channel Adapter 78 connects to the switch 66 via interconnects 79. Thus the InfiniBand Architecture is configured in this example to facilitate communication between more than one distinct computer system. The techniques shown in FIGS. 8 and 9 may be employed in combination with one another, for example a computer system using the InfiniBand Architecture for internal communications may also be connected to other computer systems via a network based on the InfiniBand Architecture.

Figure 10:
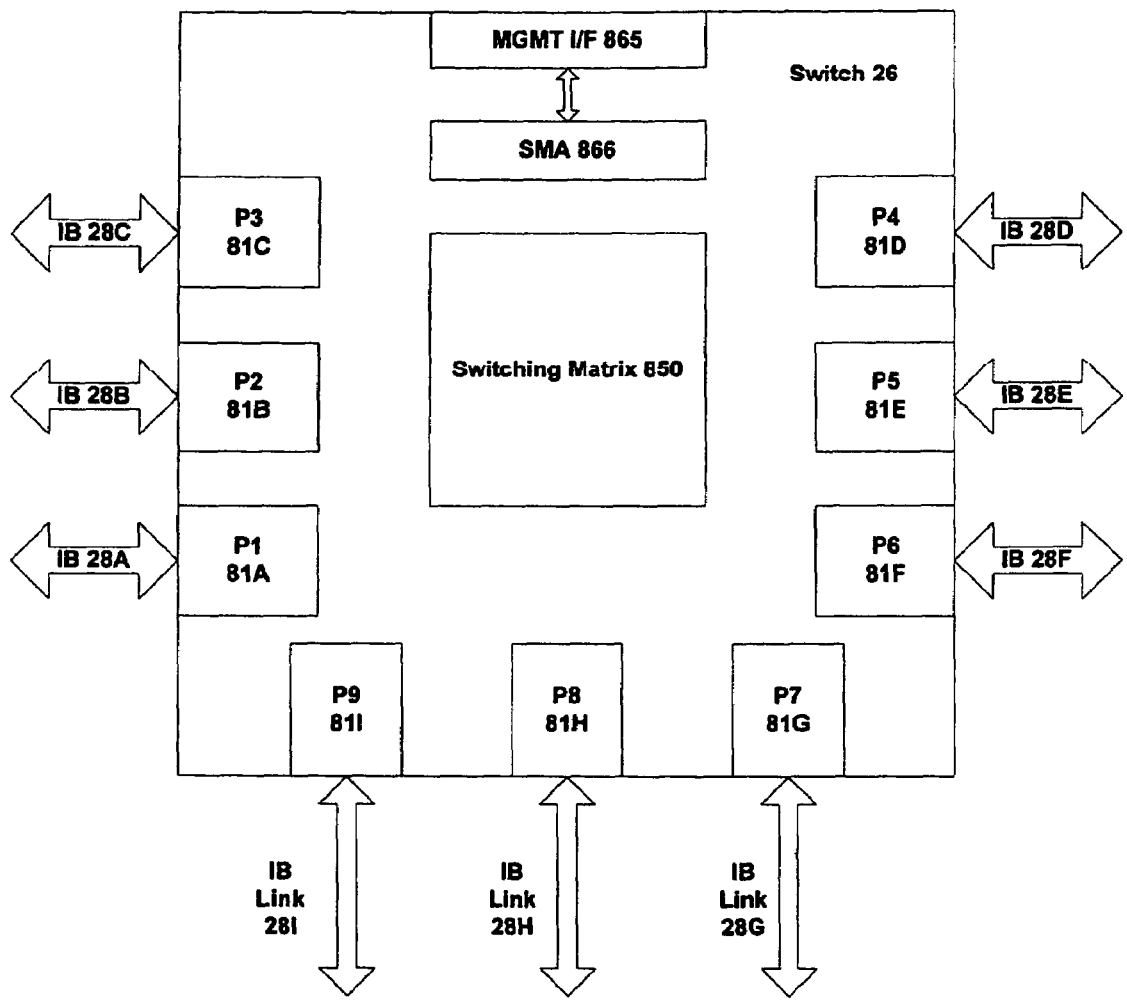
FIG. 10 is a schematic block diagram showing a switch for use in an InfiniBand network in accordance with one embodiment of the invention.

FIG. 10 illustrates a switch 26 for use in fabric 12 in accordance with one embodiment of the invention. Switch 26 is implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the embodiment illustrated in FIG. 10, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding InfiniBand duplex link 28 providing transmit (Tx) and receive (Rx) capability, and comprising one, four or twelve physical lanes. Each physical lane provides a basic data rate of 2.5 GHz, so that switch 26 provides connectivity for a total of 108 (9×12) lanes. The physical lanes into any given port are managed as a single logical link, and can be flow controlled using a credit-based link level flow control, as described above.

In accordance with the InfiniBand Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An InfiniBand switch must support at least two virtual lanes on each link (i.e. data lane VL0 and management lane VL15). In one particular embodiment, switch 26 supports four virtual lanes for general data communication plus one virtual lane for management purposes (VL15).

In accordance with the InfiniBand Architecture, a packet can be specified as having one of sixteen different service levels (SLs). The service level for a particular packet is specified in the local route header (LRH), and remains constant as the packet transits an InfiniBand subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an InfiniBand network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The InfiniBand Architecture supports the concept of partitioning in order to provide logical isolation of components sharing the same subnet. All nodes included in a route from a source to a destination must share the same 16-bit partition key (P_Key), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the P_Key value within the incoming packet matches the indexed P_Key value in the P_Key table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the embodiment mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the InfiniBand standard (in order to ensure network connectivity), to some extent switching matrix 850 can be regarded as a more generic switching device, since it is internal to switch 26 and therefore shielded (at least in part) from other network devices.

The InfiniBand architecture supports two general modes of communication. The first of these is unicast or point-to-point, in which each data packet goes from a single source to a single destination. This translates into switching matrix 850 transferring a packet from one incoming port to one outgoing port. The other mode of communication in InfiniBand is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an InfiniBand network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the InfiniBand network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

2) Source Verification

Although the DLID of a packet arriving at a particular port is checked to ensure that it matches the LID for the receiving port, the InfiniBand specification does not require any check to be performed on the validity of the SLID within the packet. In other words, the specification does not require that a port confirms that the SLID field within a packet matches the LID for the originating port. This can cause problems if there is a mismatch—i.e. if the SLID of an incoming packet does not in fact match the SLID of the port from which the packet originated.

Figure 11:
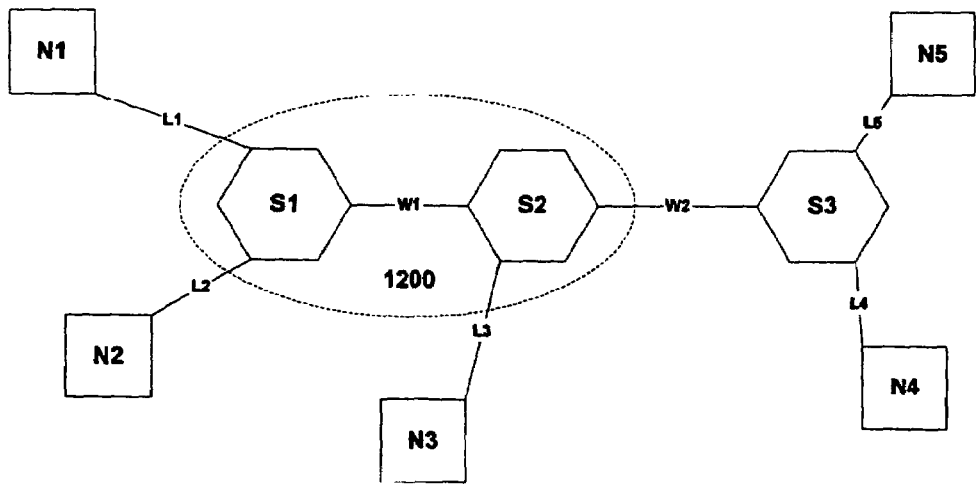
FIG. 11 is a schematic diagram showing a possible configuration of nodes and switches in an InfiniBand network.

For example, FIG. 11 depicts a sample network configuration of a subnet, which includes three switches 26, shown as S1, S2 and S3. Attached to switch SI are nodes N1 and N2; attached to switch S2 is node N3; and attached to switch S3 are nodes N4 and N5. (It will be appreciated that the subnet shown in FIG. 11 represents a rather simple network configuration, and that in practice, the number of nodes and/or switches may be significantly greater than in the diagram).

The various nodes and switches in FIG. 11 are connected by the links shown, namely link L1 between node N1 and switch S1, link L2 between node N2 and switch S1, link L3 between node N3 and switch S2, link L4 between node N4 and switch S3, and link L5 between node N5 and switch S3. In addition switch S1 is joined to switch S2 by link W1, and switch S2 is joined to switch S3 by link W2.

Consider the situation where a packet is sent from a port on node N5 to a port on node N3 via switch S3 and switch S2, but where the SLID in the packet corresponds to a port in node N4 rather than to node N5. In these circumstances, if node N3 decides for some reason to send a response packet, then this response will go to node N4 rather than to node N5. If node N3 and node N4 are not in the same partition (or are both limited members within a partition), then this response packet will be discarded. However, if node N3 and node N4 are in the same partition (and are not both limited members of the partition), then this (incorrect) response packet will be visible to node N4. This can lead to the situation where node N3 might take some incorrect or inappropriate action based on its belief that it is talking to node N4 rather than to node N5. In addition, these circumstances might also be used to attempt a denial of service (DOS) attack on node N4, by trying to flood it with (misdirected) response packets from many different nodes.

Figure 12:
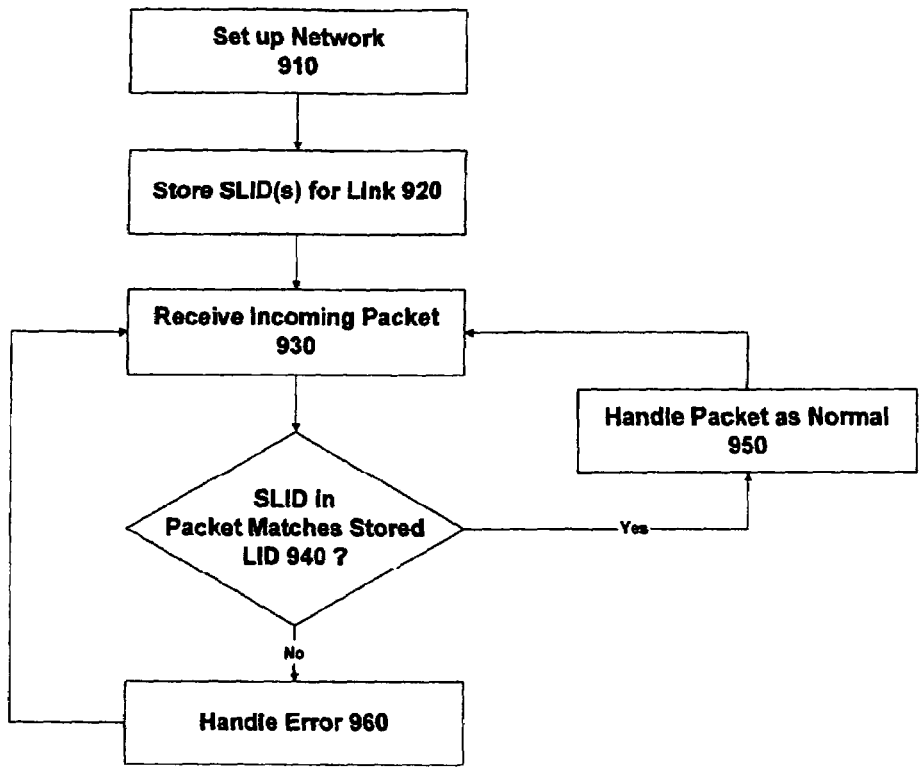
FIG. 12 is a flow-chart depicting a method for verifying the source of packets in accordance with one embodiment of the invention.

FIG. 12 depicts a schematic flowchart of a method in accordance with one embodiment of the invention, to address the problem described above. In particular, the method illustrated in FIG. 12 verifies the SLID of each packet arriving on a link at a port.

The method commences with setting up the network (910). As previously discussed, this includes the subnet manager assigning LIDs to the various ports, and creating routes through the network. As part of this set-up, a port receives and stores information about the source LID for incoming packets (920) to that port.

The link is now ready to be used for communications, and so the port receives incoming packets over the link (930). For each incoming packet, the receiving port verifies whether or not the SLID field within the LRH of the packet matches the LID of the originating port—i.e. the LID stored at operation 920 (940). If a match is confirmed, then the incoming packet is processed as normal (950), and the packet is transmitted to its onward destination. However, if a discrepancy is detected by the test at operation 940, then some alternative action is taken (960). Such alternative action may be analogous to the processing performed, for example, if an incoming packet has a P_Key violation. Thus the incoming packet may be discarded and (optionally) some form of error notification or alert may be sent from the port to the subnet manager.

If we apply the approach of FIG. 12 to the configuration of FIG. 11, switch S1 confirms, for example, that packets received over link L1 have a SLID that corresponds to node N1. Similarly, it confirms that packets received over link L2 correspond to node N2. Likewise, switch S2 confirms that packets received over link L3 have a SLID corresponding to node N3; and switch S3 confirms that packets received over link L4 have an SLID corresponding to node N4, and packets received over link L5 have an SLID corresponding to node N5.

Figure 13:
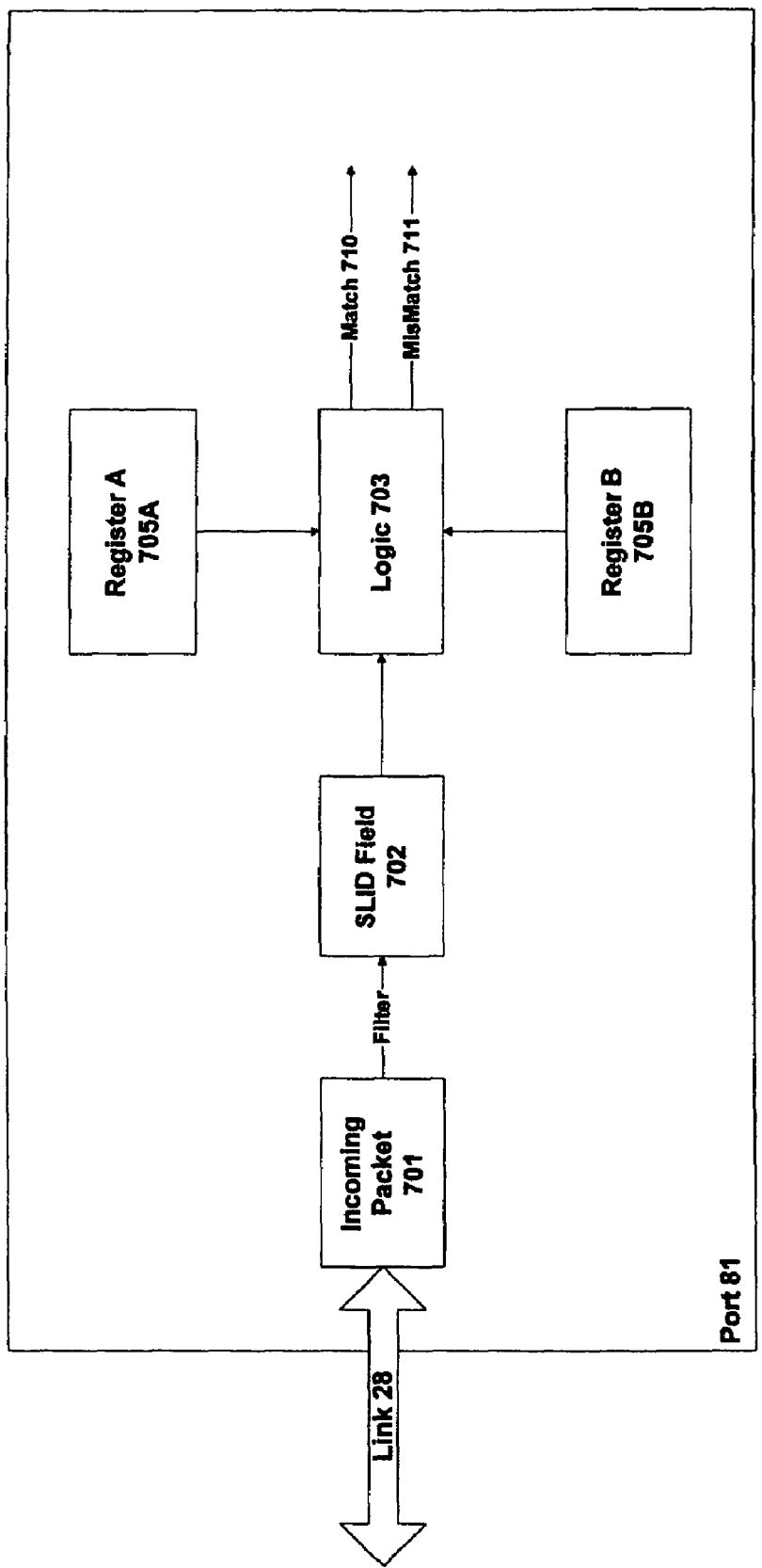
FIG. 13 is a schematic diagram showing a hardware solution for supporting the method of FIG. 12 in accordance with one embodiment of the invention.

FIG. 13 illustrates an implementation of a port 81 to support the processing illustrated in FIG. 12 in accordance with one embodiment of the invention. This embodiment is particularly suited to the configuration where the switch port is directly connected to an end-node as just described. For example, port 81 might be located in switch S1 at the end of link L1 to receive packets from node N1 (see FIG. 11).

In the embodiment of FIG. 13, port 81 receives an incoming packet 701 over link 28. The incoming packet 701 may be stored into a buffer or other component as appropriate. The SLID field 702 of the incoming packet is then extracted from the packet header by an appropriate masking or filtering of the packet 701. Note that in some embodiments, in order to maximise speed of processing, the SLID field 702 for a packet may be extracted (and subsequently tested) before the complete packet itself has arrived at the port 81. This then avoids having to wait for the whole packet to arrive before a decision can be made as to whether or not the SLID field is correct.

Port 81 further includes a logic unit 703 that compares the SLID field 702 for an incoming packet with the values stored in two registers, denoted in FIG. 13 as register A 705A and register B 705B. These two registers 705A and 705B are used to store the LID range assigned to the node at the other end of the link that is arriving at port 81 (i.e. the node from which the incoming packets 701 originate). For example, in the above situation where port 81 is at the end of link L1 in FIG. 11, register A 705A may be used to store the base LID for node N1, and register B 705B may be used to store the topmost LID for node N1 (i.e. the base LID plus setting all the path bits to one).

It will be appreciated that various other possibilities could be used for the contents of registers A and B to specify the acceptable LID range for incoming packets. For example, register A may store the base LID for the node transmitting packets into the port, while register B might then store the range of LIDs allocated to that node (this corresponds to the number of LMC bits assigned to the node). Another possibility would be to use a mask and match register—i.e. a LID L is acceptable if (L&Mask)==Match.

There are two outputs from logic 703. The first output indicates that the SLID field 702 for the incoming packet lies within the range specified by register A 705A and register B 705B. In other words, SLID field corresponds to the LID range for the expected source of the packet, and so the incoming packet 701 can be considered as validated in terms of its SLID. This is indicated by the match output 710 from logic unit 703, and corresponds to taking the positive outcome from operation 740 in FIG. 12. In contrast, if the SLID field 702 for the incoming packet is found by logic 703 not to lie within the range specified by register A 705A and register B 705B, then instead the mismatch output 711 is indicated. This indicates that there is an error associated with the incoming packet, in that the SLID field is inconsistent with the expected origin of the packet, and so corresponds to the negative outcome from operation 740 in FIG. 12. (It will be appreciated that outputs 710 and 711 may be provided as binary alternatives on a single output line from logic unit 703, such as an enable/disable line). The incoming packet 701 may therefore be accepted or rejected in accordance with whether or not the SLID value in the packet matches that expected for the link over which the packet was received, as indicated by signals 710, 711.

As previously indicated, the embodiment of FIG. 13 is particularly suited if all packets received over a link originate from a single source, having a single (contiguous) range in LID space, such as when a switch (say S1) receives communications directly from an end node (say N1). However, the situation is a little more complicated if a switch receives a packet from another switch in the subnet 12, rather than directly from an end-node 14. For example, if switch S1 receives a packet over link W1 from switch S2 (see FIG. 11) then this packet may have a SLID corresponding to N3, node N4 or node N5, since all of these end-nodes will transmit packets via switch S2 to switch S1.

In some circumstances, there may be multiple links between switch S1 and S2 arriving into different ports on S1, in which case it may be feasible to separate out the packets onto the various links according to the origin of a packet. This can then be handled by the embodiment of FIG. 13, in that the packets on any given link (i.e. arriving at any given port) should all have the same SLID. However, in many situations a single port may have to handle incoming packets originating from multiple different nodes. Accordingly, different incoming packets could have different SLID values, depending on the particular node from which they originated (e.g. node N3, node N4, or node N5).

One way to avoid this problems is that in some embodiments, switches may be regarded as trustworthy (unlike end-nodes), in which case it may be appropriate to verify the SLID only at ingress into the switch fabric. For example, if a packet is being transferred from node N1 to node N4 via switches S1, S2, and S3, in the embodiment of FIG. 11, then one possibility is to perform SLID verification only at the first switch S1. In other words, switch S1 confirms that the packets that it receives over link L1 from node Ni have an SLID corresponding to node N1. Subsequent switches (S2 and S3 in this case) may then accept that the SLID for any packet received from a switch (rather than an end node) will already have been verified, and accordingly they may decide not to perform any further SLID verification on such packets. With this approach, SLID verification is only performed on ports that are connected to end node 14, rather than to other switches 26 in the network. It will be appreciated that in these circumstances, a port only needs to verify SLIDs from a single source, i.e. the end node in question. This can then be implemented using the pair of registers shown in the embodiment of FIG. 13.

In other embodiments however, it may be the policy of switches not to automatically assume that SLID verification has already been performed on packets received from other switches, or perhaps to trust only certain other switches in the network. For example, FIG. 11 shows switches S1 and S2 marked as group 1200, where all switches within group 1200 are to be regarded as mutually trustworthy, but switches outside the group are not regarded as trustworthy. Accordingly, if switch S1 receives a communication from S2 over link W1, then it is assumed that the transmitting switch (S1) will have already performed SLID verification on the packet, and so no further SLID verification is performed. The same applies for packets travelling in the reverse direction (i.e. from switch S2 to switch S1).

However, packets received from S3 at switch S2 over link W2 are not regarded as trustworthy. In such circumstances, switch S2 therefore performs SLID verification on packets arriving over link W2 from switch S3. Such packets may have SLIDs corresponding either to node N5 or to node N4, and accordingly switch S2 has to be able to verify against multiple ranges of SLIDs.

One possible way of handling multiple valid SLID ranges is to have multiple pairs of registers 705A and 705B. Each pair of registers can then define one valid SLID range, and an incoming packet is then verified if it lies within any of the SLID ranges defined by these pairs of registers. One difficulty here is knowing how many pairs of registers to include in the switch, since clearly the network topology is not known in advance (a single switch design may be used in multiple different networks).

Figure 14:
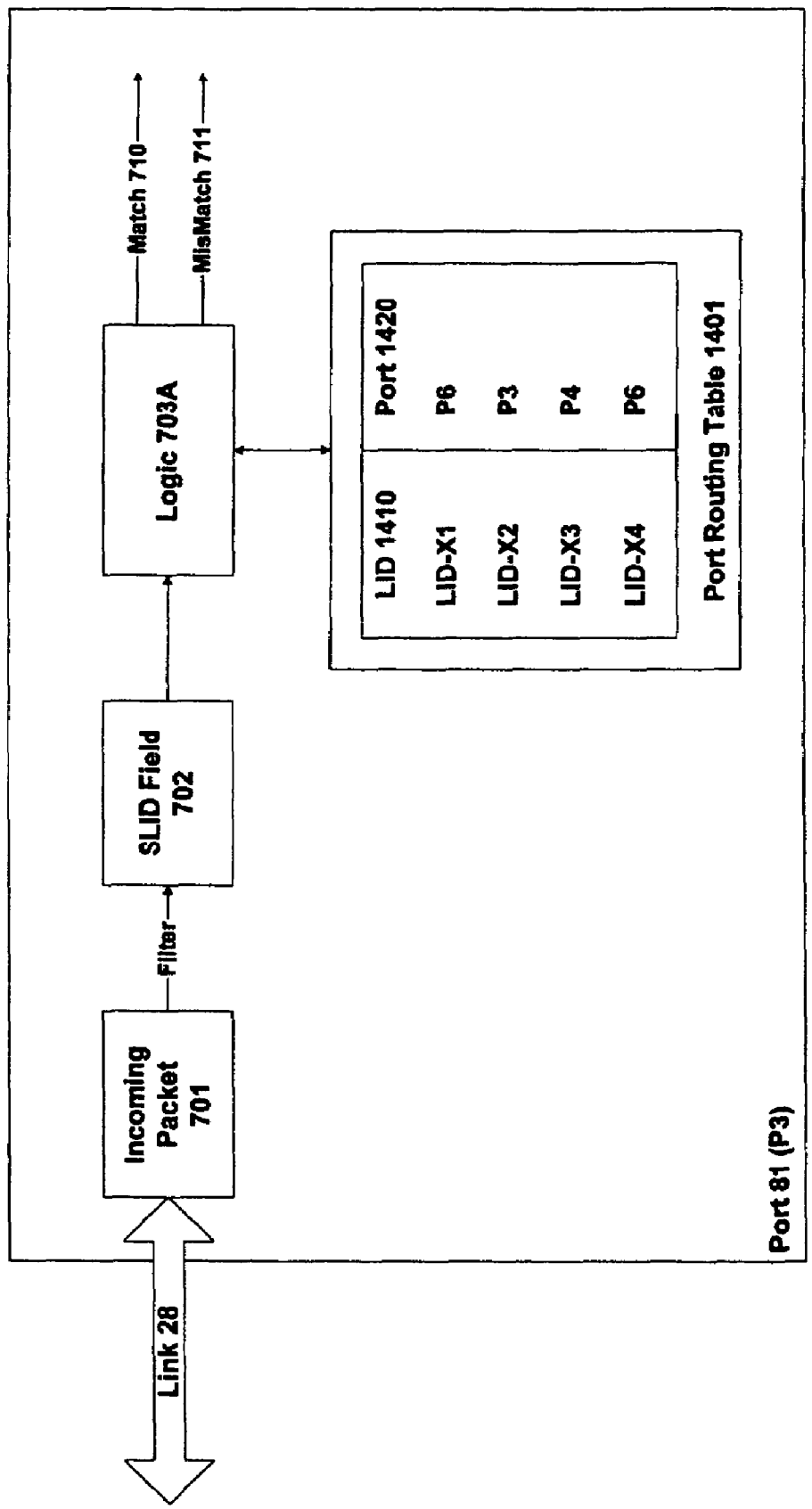
FIG. 14 is a schematic diagram showing a hardware solution for supporting the method of FIG. 12 in accordance with another embodiment of the invention.

FIG. 14 illustrates another embodiment of the invention for verifying the SLID of an incoming packet. This embodiment shares certain components with the embodiment of FIG. 13, in that an incoming packet 701 is received and the SLID field 702 is extracted by any suitable mechanism (e.g. masking, filtering, and so on).

Logic 703A within port 81 now uses the extracted SLID field to access a port routing table 1401. It will be appreciated that a conventional InfiniBand switch has a single routing table for routing packets through the switch. In particular, such a routing table maps the destination LID (DLID) of a packet to port number. Accordingly, when a packet is received at a port, the DLID for the incoming packet is extracted and used as an index into the routing table. This returns the (output) port corresponding to the DLID. The receiving port therefore knows which port to route the packet through the switch to, in order to ensure that the packet is sent onwards to the correct destination.

In accordance with one embodiment of the present invention, switch 26 includes a routing table 1401 that is specific to each port 81 on the switch. As for a conventional routing table, this routing table 1401 can be regarded as having two columns, namely a first column 1410 representing LID, and a second column 1420 representing port. Accordingly, this routing table 1401 can be indexed by LID in order to obtain a port number.

Routing table 1401 can be used by the port 81 to route packets through the switch 26 in the manner just described in relation to existing systems. In other words, a DLID can be extracted from an incoming packet 701 and used to index into the port routing table 1401, thereby allowing the appropriate port for onward transmission of the packet to be identified. The port can then route the packet through the switch to the outgoing port.

In accordance with one embodiment of the present invention, the port routing table 1401 can also be used to perform SLID verification. Thus rather than specifying an acceptable range of SLIDs using registers 705A and 705B, as in the embodiment of FIG. 13, the embodiment of FIG. 14 specifies this range instead in port routing table 1401.

Conceptually, for any given port 81, LID space can be divided into two portions. The first corresponds to LIDs for nodes on the external (link) side of the port. The second corresponds to LIDs for nodes on the internal (switch) side of the port. It will be appreciated that an external LID represents a valid SLID, but not a valid DLID, while an internal LID represents a valid DLID, but not a valid SLID (for that particular port).

Accordingly, the LID values 1410 in port routing table 1401 cover both the internal and external range of LID values. Each LID value 1410 has a corresponding port value 1420. Associated with the external LID values are the port numbers for onward transmission, as in a conventional routing table. Associated with the internal LID values (i.e. with LIDs corresponding to an acceptable SLID) is the port number for the port itself, in other words the port that owns routing table 1401. (It will be appreciated that for the embodiment of FIG. 10, routing table 1401 needs an extra bit in the port column 1420, in view of the possibility of both internal and external LID state. In particular, the routing table 1401 now has to identify one of nine different ports, including the owning port, rather than just the eight different ports to which the packet might be forwarded. This extra bit is only required if the switch has N+1 data ports, where N is a power of two).

Routing table 1401 is therefore used for two different tasks. The first represent a conventional determination of the port to which a particular incoming packet 701 should be forwarded. In this case, a look-up will be performed based on the value of DLID in the incoming packet. In addition, routing table 1401 will also be consulted when the SLID is to be verified, in which case the look-up is performed based on the value of SLID in the incoming packet.

When the DLID lookup is performed for routing purposes, then an acceptable result is the port number for any port other than the port that owns table 1401.

Conversely, for SLID authentication, the only acceptable result is the port number corresponding to the port that owns table 1401. This then reflects the split of LID space between external values (for SLID verification) and internal values (for DLID routing). If a DLID lookup does return the port number corresponding to the port that owns table 1401, this represents an error, i.e. a failed routing. Likewise, if an SLID lookup does not return the port number corresponding to the port that owns table 1401, this also represents an error, and so implies failure of the SLID authentication.

In the particular example shown in FIG. 14, it is assumed that port 81 corresponds to P3. In this case, only the LID range identified as LID-X2 in table 1401 would represent a valid SLID, while LID ranges LID-X1, LID-X3, and LID-X4 would all represent invalid SLIDs. Conversely, LID-X2 would represent an invalid DLID, but any of the other LID ranges in table 1401 would represent valid DLIDs.

Accordingly, routing table 1401 can be used to support one or more valid SLID ranges by entering each range into routing table 1401, and allocating as the corresponding port number 1420 the port number for the port with which that particular routing table 1401 is associated. It will be appreciated that this approach has the advantage of using an infrastructure (i.e. port routing table 1401) that may already be present within port 81.

Note that there may be some LID values that do not correspond either to a valid DLID or to a valid SLID. For example, some LID values may not be assigned within the network 12 (or may not have routes associated with them). In addition, as previously mentioned, switch 26 may have its own LID range corresponding to port 0 (the management interface). These LID ranges can then be assigned special port numbers in the routing table 1401, e.g. port −1 for an unassigned LID value, and port 0 for the LID range of the management interface. In general these special port values do not represent a valid SLID or a valid DLID, and have to be specially handled.

Another possibility is to use registers, such as registers 705A and 705B, to pick out packets that have an SLID or DLID in these special ranges. In this case, the special ranges do not need to be added to the routing table itself 1401, rather packets having an SLID or DLID in such special ranges can be identified using the registers, and processed separately from other packets.

It will be appreciated where there are multiple valid SLID ranges all being received at the same port, the verification described above confirms that the SLID of an incoming packet corresponds to one of the valid SLID ranges. This is not exactly the same as saying that the SLID in the packet corresponds exactly with the source of the packet, only that it corresponds to one of the possible sources (for that network configuration). This ambiguity can be avoided if SLID verification is always performed at first ingress of the packet into the switching fabric, i.e. at the switch port connected to the end node that originated the packet.

Although the SLID verification described herein has been shown as having been implemented in a switch 26, it will be appreciated that such verification may also be implemented in an end node 14. An end node will not normally have a routing table 1401, but may be provided with one or more pairs of registers 705A, 705B such as for the embodiment of FIG. 13. Since an end node is connected to a switch, it may potentially receive packets from multiple sources (i.e. corresponding to multiple SLID ranges). However, at any given time, the end node might only be involved in communications with a single other node, in which case there would only be a single SLID range to confirm.

Although the embodiment of FIG. 14 utilises a combined DLID/SLID lookup table 1401, in another embodiment separate lookup tables could be provided for DLID and SLID. The SLID lookup table would operate as described above, namely for any given input LID value it would return a result indicative of whether or not that LID represented a valid SLID. Splitting the DLID and SLID lookups would be less compact than the approach of FIG. 14, but could be appropriate if switch 26 has only a single shared routing table rather than a per port routing table. In this case it is more difficult to accommodate the SLID lookup into the DLID routing table (since the SLID lookup is port specific, unlike the DLID routing table), and so the switch might support an SLID lookup table for SLID verification. This could be provided on a per port basis, or alternatively as a shared table for all ports on the switch.

One possibility would be to have a table of flag arrays shared by all input ports, where each flag array represents a bit mask for a specific SLID value. The SLID value could then be used as a table index to locate the appropriate bit mask. A bit mask for a given SLID value then comprises a series of flags, one for each port. Each flag is a (single bit) binary value indicating whether the corresponding port is allowed to received the corresponding SLID value. Alternatively, in a per-port implementation, each input port could have a table of (single bit) flags, with each flag defining whether or not a corresponding SLID value is acceptable.

One embodiment of the invention described herein is provided as a computer program product, which may comprise program instructions stored on a removable storage medium, for example an optical (CD ROM, DVD, etc), semiconductor (e.g. flash memory) or magnetic (floppy disk, tape, etc) device. Such a medium can then be introduced into a computer system, such as a server, a client, a smart card, a network device (e.g. a switch) etc., in order to transfer the program instructions to the system. Alternatively, the program instructions may be transferred to the computer system by download via a transmission signal medium over a network, for example, a local area network (LAN), the Internet, and so on. The transferred program instructions are often stored on a hard disk or other non-volatile storage of a computer system, and loaded for use into random access memory (RAM) for execution by a system processor.

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. A method of handling an incoming packet at a node in a network, the method comprising:
    associating at least one source identifier with a link to said node;
    receiving a packet at the node over said link;
    identifying a sending node from the at least one source identifier associated with the received packet;
    if the sending node and the node in the network are in a mutually trustworthy group, then avoiding a source local identifier (SLID) verification;
    otherwise performing the SLID verification by:
        extracting a source identifier from the received packet; and
        comparing the extracted source identifier with said at least one source identifier associated with said link to authenticate the packet.

2. The method of claim 1, wherein said source identifier is extracted from a header of the packet.

3. The method of claim 1, wherein said at least one source identifier associated with a link comprises at least one range of source identifiers.

4. The method of claim 3, wherein the extracted source identifier is authenticated if it lies within said at least one range of source identifiers.

5. The method of claim 3, further comprising using a pair of registers to store each range of source identifiers.

6. The method of claim 1, wherein said node comprises a switch in the network having multiple ports, and wherein said link is connected to one of the ports of the switch.

7. The method of claim 6, wherein an incoming packet includes a destination identifier having the same format as the source identifier, and the switch includes a routing table that maps a destination identifier to one of said multiple ports.

8. The method of claim 7, wherein the switch includes a routing table for each port.

9. The method of claim 7, wherein said routing table is used to perform said authentication.

10. The method of claim 9, wherein said comparing comprises:
    accessing the routing table using the extracted source identifier as if it were a destination identifier; and
    determining the port mapped to the extracted source identifier in the routing table, wherein the packet is only authenticated if the determined port is connected to the link on which the packet was received.

11. The method of claim 9, wherein said routing table contains multiple ranges of associated source identifiers, and the packet is authenticated if the extracted source identifier corresponds to any of said multiple ranges.

12. The method of claim 1, wherein the incoming packet is discarded if the packet is not authenticated.

13. The method of claim 1, wherein an error notification is raised if the packet is not authenticated.

14. The method of claim 1, wherein the network conforms to the InfiniBand specification.

15. The method of claim 1, wherein said authentication is only performed where said link is connected to an untrusted node in the network.

16. A communications node comprising:
    a port for connection to a link to receive an incoming packet from a network;
    memory associating at least one source identifier with said link, wherein a source identifier is extracted from said received packet;
    logic for identifying a sending node from the at least one source identifier associated with the received packet;
    logic for testing if the sending node and the communication node are in a mutually trustworthy group, thereby avoiding a source local identifier (SLID) verification;
    logic for performing the SLID verification; and
    logic for comparing the extracted source identifier with said at least one source identifier associated with said link to authenticate the packet.

17. The communications node of claim 16, wherein said communications node comprises a switch chip.

18. The communications node of claim 16, wherein said source identifier is extracted from a header of the packet.

19. The communications node of claim 16, wherein said at least one source identifier associated with a link comprises at least one range of source identifiers.

20. The communications node of claim 19, wherein the extracted source identifier is authenticated if it lies within said at least one range of source identifiers.

21. The communications node of claim 19, further comprising a pair of registers to store each range of source identifiers.

22. The communications node of claim 21, wherein said node comprises a switch in the network having multiple ports, and wherein said link is connected to one of the ports of the switch.

23. The communications node of claim 22, wherein an incoming packet includes a destination identifier having the same format as the source identifier, and the switch includes a routing table that maps a destination identifier to one of said multiple ports.

24. The communications node of claim 23, wherein the switch includes a routing table for each port.

25. The communications node of claim 23, wherein said routing table is used to perform said authentication.

26. The communications node of claim 25, wherein said logic accesses the routing table using the extracted source identifier as if it were a destination identifier; and determines the port mapped to the extracted source identifier in the routing table, wherein the packet is only authenticated if the determined port is connected to the link on which the packet was received.

27. The communications node of claim 25, wherein said routing table contains multiple ranges of associated source identifiers, and the packet is authenticated if the extracted source identifier corresponds to any of said multiple ranges.

28. The communications node of claim 16, wherein the incoming packet is discarded if the packet is not authenticated.

29. The communications node of claim 16, wherein an error notification is raised if the packet is not authenticated.

30. The communications node of claim 16, wherein the network conforms to the InfiniBand specification.

31. The communications node of claim 16, wherein said authentication is only performed where said link is connected to an untrusted node in the network.

32. A computer-readable storage medium encoded with program instructions that when loaded into a machine cause the machine to perform a method for handling an incoming packet at a node in a network, said method comprising:
    associating at least one source identifier with a link to said node;
    receiving a packet at the node over said link;
    indentifying a sending node from the at least one source identifier associated with the received packet;
    if the sending node and the node in the network are in a mutually trustworthy group then avoiding a source local identifier (SLID) verification;
    otherwise performing the SLID verification by:
        extracting a source identifier from the received packet; and
        comparing the extracted source identifier with said at least one source identifier associated with said link to authenticate the packet.

* * * * *